May 6, 1924.
I. E. WHITE
MEAT SLICER
Filed March 30, 1923    2 Sheets-Sheet 1
1,492,617
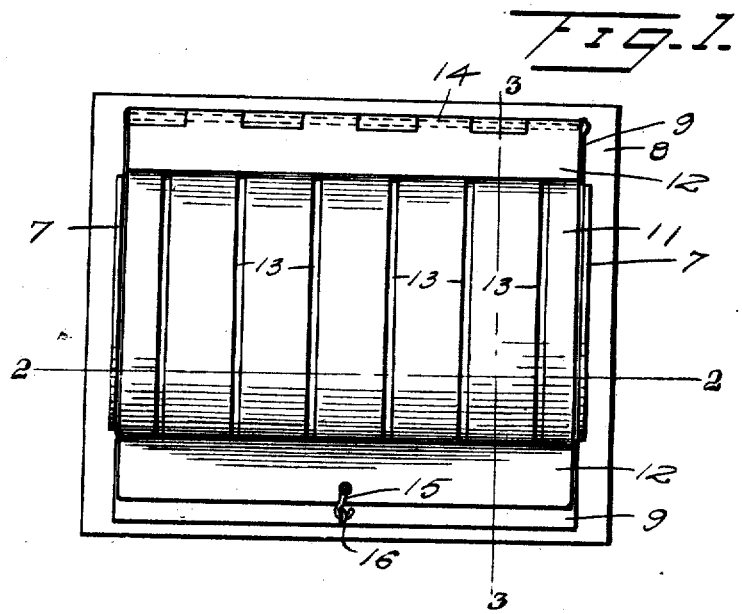
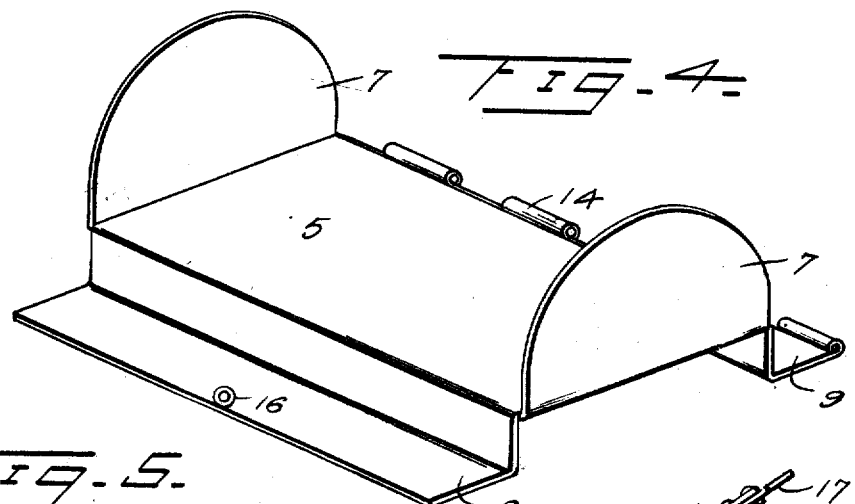
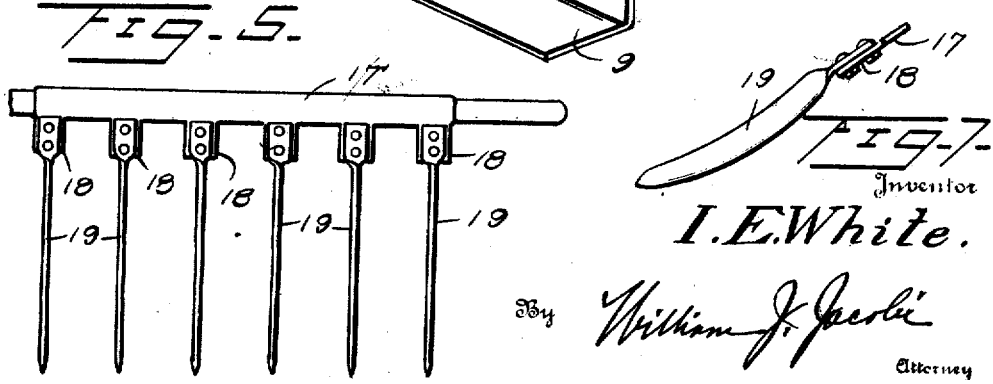
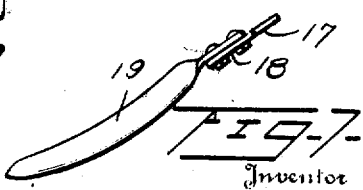
Inventor
I. E. White.

May 6, 1924.
I. E. WHITE
MEAT SLICER
Filed March 30, 1923 2 Sheets-Sheet 2
1,492,617
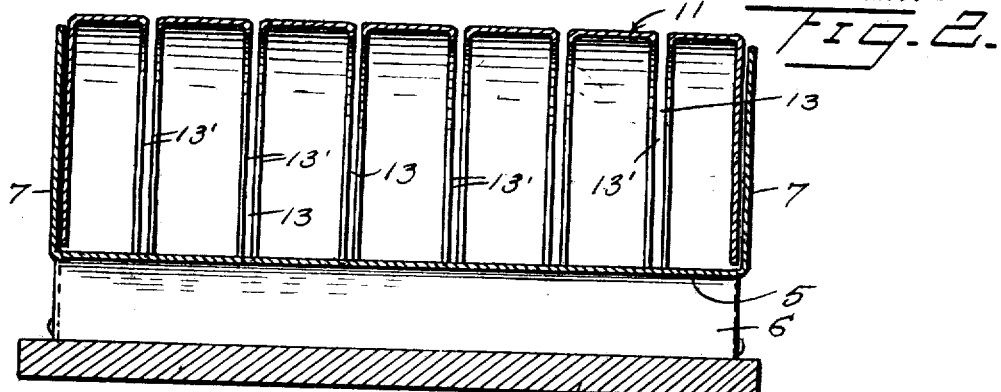
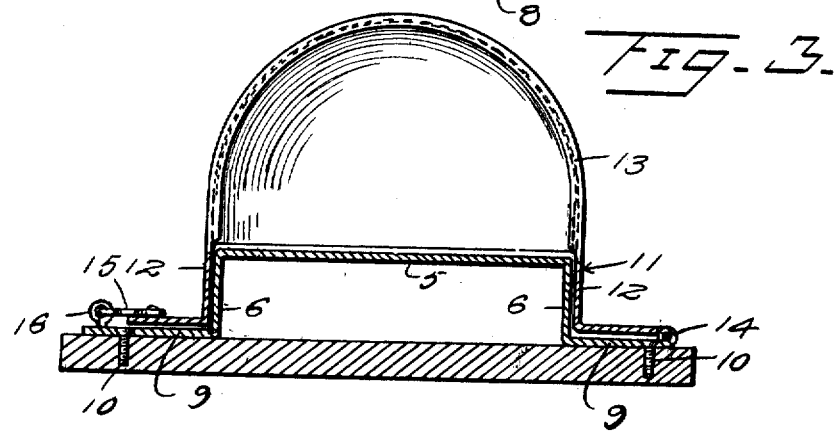
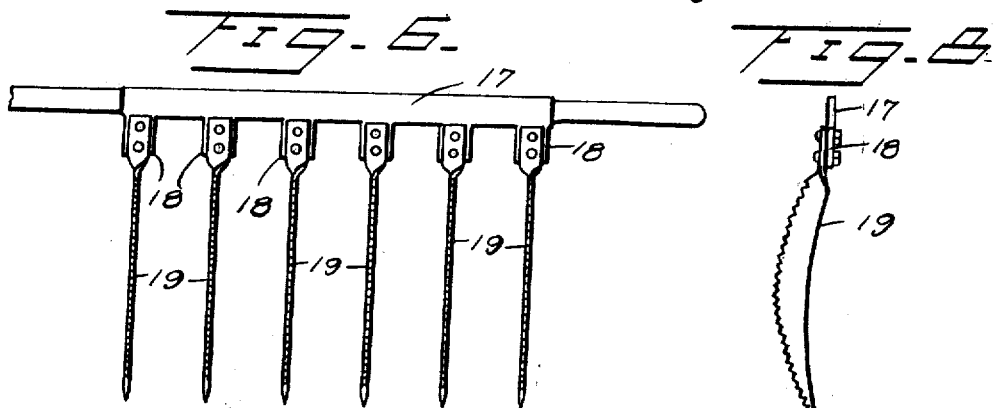
Inventor
I. E. White Patented May 6, 1924.

1,492,617

UNITED STATES PATENT OFFICE.

IDA E. WHITE, OF GALVESTON, TEXAS.

MEAT SLICER.

Application filed March 30, 1923. Serial No. 628,887.

*To all whom it may concern:*

Be it known that IDA E. WHITE, a citizen of the United States of America, residing at Galveston, in the county of Galveston and State of Texas, has invented certain new and useful Improvements in Meat Slicers, of which the following is a specification.

My invention relates to meat slicers and its principal object is to provide a device of this character wherein a plurality of slices of meat or other material may be cut in a single operation.

A further object of the invetnion is to provide a slicing device particularly adapted for household use where it is desired to cut up a quantity of meat quickly and effectively and which consists of parts so arranged to permit the device to be readily cleaned at all times, thus rendering it sanitary.

Further the invention contemplates a device of this character embodying a tray for supporting meat or other food to be cut up and a plurality of knife guides arranged over the tray to receive the knife blade of a multiple knife.

Another object of the invention is to provide a device of this character embodying a knife having a plurality of removable knife blades any one or more of which can be readily detached for the purpose of sharpening or grinding the same and in case one becomes broken a new one may be arranged in its place.

With the preceding and other objects in mind the invention consists in the novel combination of elements, constructions and arrangement of parts and operations to be hereinafter specifically referred to, claimed and illustrated in the accompanying drawing wherein, Figure 1 is a top plan view of a meat cutter constructed in accordance with my invention.

Figure 2 is a longitudinal sectional view of the same taken on line 2—2 of Fig. 1.

Figure 3 is a transverse sectional view taken on line 3—3 of Fig. 1.

Figure 4 is a perspective of the pan or tray embodying the invention.

Figure 5 is a detail view of the multiple knife embodying the invention, and

Figure 6 is a similar view of a multiple bone cutting knife or saw embodying the invention.

Figure 7 is an end elevation of one of the knife members shown in Fig. 5; and

Figure 8 is a similar view of one of the knife members illustrated in Fig. 6.

Referring in detail to the drawings wherein corresponding characters of reference denote like parts thruout the several views, the numeral 5 denotes a tray constructed of sheet metal. This tray includes side walls 6 which extend downwardly beyond the base or bottom of the tray and end walls 7 that extend above the base or bottom of the tray, this being shown in Fig. 2. Securing flanges 9 are formed with the opposite longitudinal edges of the side walls 6 and are to be secured to a base 8 by means of fastenings 10.

The numeral 11 designates a hood for cooperation with the pan or tray 5 and is constructed also of sheet metal and is indicated at 12. The side walls extend beyond the side walls 6 while the end walls are parallel to and disposed adjacent the end walls 7.

A top wall of the hood 12 forms a plurality of transversely extending slits 13 and the free edges of the metal between the slits bent downwardly to afford knife guides $13^1$ to receive a plurality of knife blades to be hereinafter referred to. The rear edge of the hood 12 is hinged to one of the flanges 8 as indicated at 14 and its free edge is provided with a hook 15 engageable in an eye 16 carried by the opposite flange 8.

The knife consists of a cross bar 17 from which there are a plurality of forward extensions 18. Riveted or otherwise secured to each of these extensions 18 is a knife blade 19. A similar device is shown in Fig. 6 having a plurality of knives having serrated edges or saw elements is provided for cutting thru the bone of the meat. Such a device as well as the knife will permit any one or more of the knives or saw elements to be removed for the purpose of sharpening or grinding the same.

From the disclosure it will be obvious that the meat placed on the tray or pan 5 and the cover of the hood being in a position to overlie the pan or tray receives the knife blades in the guides and upon reciprocation of the latter across the meat the latter will be cut into a plurality of slices. It will be seen that I have provided a simple and inexpensive device for performing these operations and that the same may be readily employed in cutting large quantities of meat such as in hotels, restaurants, farm houses or in the private home.

Further the invention may be used to cut up vegetables or cabbage to make slaw, sauer kraut and the like.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to secure by Letters Patent is:—

1. A device of the character described comprising a sheet metal base having a bottom and side walls extending downwardly therefrom, end walls extending above the bottom, a metal hood overlying the base and having a plurality of transversely extending knife guides therein and additional end walls formed on said hood adapted for disposition within the end walls of the base to rest on said bottom.

2. A device of the class described comprising a support, a tray thereon having integral depending side flanges, said flanges being bent angularly to form base flanges, means for securing the base flanges to said support, upstanding end walls formed on said tray, an overlying hood hinged along one side edge thereof to one of the base flanges of said tray to permit the free edge to rest on the other base flange of said tray, said hood being slitted to provide a plurality of knife guides therein, and depending end walls formed on said hood adapted to be disposed within the end walls of said tray to rest on the latter when the hood is in lowered position.

In testimony whereof I affix my signature.

IDA E. WHITE.